United States Patent [19]
Ramanathan et al.

[11] Patent Number: 6,022,930
[45] Date of Patent: Feb. 8, 2000

[54] PROCESS FOR PRODUCING POLYCONDENSABLE MACROMONOMER

[75] Inventors: Lalgudi Srinivasan Ramanathan; Swaminathan Sivaram, both of Pune Maharashtra, India

[73] Assignee: Council of Scientific & Industrial Research, New Delhi, India

[21] Appl. No.: 09/143,028

[22] Filed: Aug. 28, 1998

[30] Foreign Application Priority Data

Jun. 12, 1998 [IN] India ........................................ 1635/98

[51] Int. Cl.⁷ ....................................... C08F 20/00
[52] U.S. Cl. ........................... 525/451; 528/271; 528/373; 528/390; 528/392; 525/535; 525/539; 524/706; 524/710; 524/713; 524/714; 524/722; 524/742
[58] Field of Search ..................................... 528/271, 373, 528/390, 392; 525/451, 535, 539; 524/706, 710, 713, 714, 722, 742

[56] References Cited

U.S. PATENT DOCUMENTS

| | | | |
|---|---|---|---|
| 4,818,804 | 4/1989 | Kuriyama et al. | 526/211 |
| 5,066,759 | 11/1991 | Hille et al. | 528/60 |
| 5,185,421 | 2/1993 | Cohen et al. | 528/70 |
| 5,254,632 | 10/1993 | Kerscher et al. | 525/309 |

*Primary Examiner*—Samuel A. Acquah
*Attorney, Agent, or Firm*—Ladas & Parry

[57] ABSTRACT

This invention relates to the process for the preparation of macromonomers with more than one polycondensable functional groups with equal reactvity, which comprises reacting a carboxyl or hydroxyl terminated prepolymers, with an organic compound containing two or more isocynnate reactive functional groups, in the presence of a dehydrating agent and a non-reactive solvent at ambient temperatures, separating the product from the reaction mixture by conventional means.

7 Claims, No Drawings

PROCESS FOR PRODUCING POLYCONDENSABLE MACROMONOMER

FIELD OF THE INVENTION

This invention relates to a process for producing macromonomers. More particularly, it relates to a process for preparation of macromonomers with more than one polycondensable functional groups with equal reactivity, having formula (I)

FORMULA I

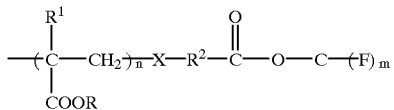

wherein,

R=an alkyl group with 1–40 carbon atoms;
$R^1$=hydrogen or methyl;
$R^2$=alkylene units;
X=is a bifunctional moiety;
F=is a functional group;
n=3–45 and
m=≧2.

The process of the present invention is employed to produce macronomers which are useful in the production of tailor made graft copolymers and find application as surface active agents, compatibilizers, adhesion promoters, organic coating and biopolymers. Employing the process of present invention, compound of formula I is produced by direct esterification reaction of a carboxylic group containing polymer of formula (II)

FORMULA II

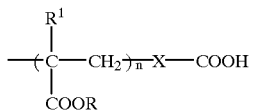

and an organic compound with more than one hydroxyl group.

BACKGROUND OF THE INVENTION

Macromonomers are defined as reactive oligomers. They are linear and carry some functional groups, preferably at the chain ends. They are classified into addition polymerizable and condensation polymerizable macromonomers based on the nature of the terminal functional groups. The molecular weight of macromonomers range from 500–50,000 and particularly in the range between 1000 and 25000. The synthesis of macromonomers is described in detail in the literature. [Sivaram, S., J. Scientific and Ind. Res., 56, 1, (1997); Gnanou, Y., Ind. J. Technol., 31; 317, (1993); Corner, T., Adv. Polym. Sci., 62, 95, (1984); Rempp. P. F., Adv. Polym. Sci., 58, 53, (1981)].

Macromonomers are generally produced by ionic living polymerization, group transfer polymerization and free radical polymerization techniques. Of these, the radical routes of producing macromonomers are commercially acceptable, as they do not require rigorous experimental conditions. Also, the number of monomers amenable to free radical polymerization is large. Macromonomers are useful in the production of tailor made graft copolymers and find application as surface active agents, compatibilizers, adhesion promoters, organic coatings, and biomaterials.

Preparation of macromonomers via free radical method and/or by condensation method is known in the prior art. In one such application, U.S. Pat. No. 5,066,759 describes a process for preparing macromonomer with two antagonists functional groups. Herein the macromonomer is produced by the reaction between a diisocyanate and a prepolymer with a carboxyl group at one end and a hydroxyl or amino group at the other end. However the diisocyanate may also react with the carboxyl group and would not yield a macromonomer with a well-defined terminal functionality. Eur. Pat. Appl. 248574 (Chem. Abst. 108:187481w) describes the preparation of carboxy group containing hydrophilic macromonomer. Herein, the functional group is derived from initiator fragments. U.S. Pat. No. 5,254,632 describes a process for producing macromonomer through a transesterification reaction between hydroxyl terminated polyalkylmethacrylate and monomeric ester. U.S. Pat. No. 5,185,421 describes the preparation of fluorinated macromonomer with one or more hydroxyl groups. U.S. Pat. No. 4,818,804 describes the preparation of macromonomers derived from vinyl monomers and mercapto compounds. The polycondensable macromonomer thus obtained contains one or more carboxyl groups, which are attached to primary and secondary carbon atoms. This induces a difference in reactivity of the functional groups and limits the usage of such macromonomer in isocyanate polyaddition or polyesterification reactions.

In prior art, the polycondensable macromonomers with antagonist functional groups are obtained by step growth polymerization that contains ill-defined terminal functional groups. Macromonomers produced through radical transfer reaction contains one or more terminal functional groups with different reactivity and limits its usage in further polymerization reactions.

OBJECTS OF THE INVENTION

The object of the present invention is to provide a method for the preparation of polycondensable macromonomer by free radical polymerization.

Another objective of the present invention is that the polycondensable groups in the macromonomer possess equal reactivity.

DETAILED DESCRIPTION

Accordingly, the present invention provides a process for the preparation of macromonomers by reacting a carboxyl or hydroxyl terminated prepolymers, with an organic compound, containing two or more isocyanate reactive functional groups, in presence of a dehydrating agent and a non-reactive solvent at ambient temperature for a period ranging between 3 and 12 hours, and separating the product from the reaction mixture by conventional methods.

In an embodiment of the present invention the carboxyl or hydroxyl group containing prepolymer is prepared by polymerizing a monomer of the formula (III),

FORMULA III

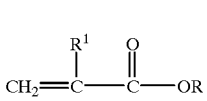

which is exemplified by methyl methacrylate, butyl methacrylate, lauryl methacrylate, ethyl acrylate, butyl acrylate, hexyl acrylate, n-octyl acrylate, 2-ethylhexyl acrylate, nonyl acrylate, lauryl acrylate and styryl acrylate in presence of a bifunctional agent of the formula (IV)

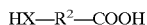

FORMULA IV or (V)

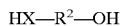

FORMULA V which includes but is not limited to mercaptoacetic acid, 3-mercaptopropionic acid, mercaptosuccinic acid, 2-mercapto ethanol, 1-mercapto-2-propanol and 3-mercapto-1-propanol.

In another embodiment of the present invention the multifunctional organic compounds are reactive in the context of esterification reaction which are exemplified by trimethylol propane, ditrimethylol propane, 1,2,6-hexane triol (its isomers), pentaerythrytol, di and tripentaerythrytol, sorbitol and glycerine.

In still another embodiment of the present invention the dehydrating agent used includes, but is not limited to, dicyclohexylcarbodiimide, N,N'carbonyldiimidazole, aminopyridine, phenyl dichlorophosphate, chlorosulfonyl isocyanate, chlorosilanes, alkyl chloroformate-triethyl amine, pyridinium salts-tributyl amine, 2-chloro-1,3,5-trinitrobenzene-pyrimidine and phosphate ester.

In yet another embodiment of the present invention the solvents used are non reactive towards the prepolymer, multifunctional organic compounds and the dehydrating agent and the solvents are exemplified by chlorinated hydrocarbons, esters, ethers, ketoesters, aliphatic, aromatic and alicyclic hydrocarbons, hydrogenated furans and the mixtures thereof.

In a feature of the present invention, the polymerization can be carried out in any conventional resin reactor equipped with a cooling jacket, a double walled condenser, a thermowell, and an addition funnel for monomer feeding. Stirring can be done by using a magnetic stirrer or by any stirring device. The polymerization reaction can be carried out between 40° C. and 100° C. and more preferably between 60° C. and 90° C. The reaction is exothermic in the beginning and can be controlled by circulating cool water or by drop wise feeding of monomer. The desired molecular weight of the macromonomer is obtained by adjusting the molar ratio of bifunctional agent to monomer. The amount in mol percentage of the bifunctional agent based on the amount of monomer charged is preferably in the range between 1 and 45. The polymerization is initiated by the addition of initiator which have a decomposition half life at 70±10° C. of ≦8 hours, which are exemplified by 2,2'-azobis-2-methyl butyronitrile, 2,2'-azobis-isobutyronitrile, 2,2'-azobis-2-cyclopentyl propionitrile and di-(2-hydroxypropyl)-2,2'-azobis-isobutyrate. The polymerization begins rapidly when the decomposition temperature of the initiator is reached. The reaction is continued until the disappearance of double bond as evident from the $^1$H NMR spectrum. The polymer obtained is recovered by precipitation in methanol.

In yet another feature of the present invention, the macromonomer with polycondensable functional group is obtained by the esterification reaction between the prepolymer and an organic compound with two or more functional groups. The esterification reaction is carried at ambient temperature in the presence of carboxyl group activator (CGA) or hydroxyl group activator (HGA). Advantageously by adopting this esterification procedure one can react a carboxy functional or hydroxy functional containing prepolymer with an organic compound having two or more hydroxyl or carboxyl group respectively, at ambient temperature. The reaction is carried out by mixing the prepolymer in a suitable solvent. The prepolymer solution is preferably cooled between 0° C. to 15° C. and then the multifunctional organic compound and the dehydrating agent are added. Alternatively, the prepolymer solution can also be added to a cooled mixture of multifunctional organic compound and the dehydrating agent. The ambient temperature esterification reactions disclosed in the present invention are very fast and are completed within 1 to 6 hours. The urea formed during the reaction if filtered off and the product is recovered by distilling the solvent.

The process for the present invention is described herein below with examples which are illustrative only and should not be construed to limit the scope of the present invention in any manner.

EXAMPLES 1–6

These examples illustrate the preparation of polycondensable macromonomer from a carboxyl containing prepolymer, an organic multifunctional group and a dehydrating agent.

EXAMPLE 1

In a three neck 100 ml round bottom flask fitted with a thermowell, condenser, a magnetic needle and a glass tube for nitrogen purging, charged 25 gram laurylmethacrylate, 3.6 gram mercapto acetic acid, 0.16 gram azobis isobutyronitrile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is allowed to evaporate and the polymer is dried under vacuum at room temperature. In a separate three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 0.9 gram dicyclohexyl carbodiimide, 25 milligram dimethyl aminopyridine are then added followed by 0.8 gram trimethylol propane. The reaction is continued for 3 to 6 hours. Urea formed during the reaction is removed and the product is obtained by evaporating the filtrate.

EXAMPLE 2

In a three neck 100 mL round bottom flask fitted with a thermowell, condenser, a magnetic needle and a glass tube for nitrogen purging, charged 25 gram laurylmethacrylate, 1.8 gram mercapto acetic acid, 0.16 gram azobis isobutyronitrile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is then allowed to evaporate and the polymer is dried under vacuum at room temperature. In a separate three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 0.5 gram dicyclohexyl carbodiimide, 25 milligram dimethyl aminopyridine are then added followed by 0.43 gram trimethylol propane. The reaction is continued for 3 to 6 hours. Urea formed during the reaction is removed and the product is obtained by evaporating the filtrate.

EXAMPLE 3

In a three neck 100 mL round bottom flask fitted with a thermowell, condenser, a magnetic needle and a glass tube for nitrogen purging, charged 25 gram laurylmethacrylate, 0.73 gram mercapto acetic acid, 0.16 gram azobis isobutyronitrile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is then allowed to evaporate and the polymer is dried under vacuum at room temperature. In a three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 0.2 gram dicyclohexyl carbodiimide, 25 milligram dimethyl aminopyridine are then added followed by 0.16 gram trimethylol propane. The reaction is continued for 3 to 6 hours. Urea formed during the reaction is removed and the product is obtained by evaporating the filtrate.

EXAMPLE 4

In a three neck 100 mL round bottom flask fitted with a thermowell, condenser, a magnetic needle and a glass tube for nitrogen purging, charged 25 gram methyl methacrylate, 3.6 gram mercapto acetic acid, 0.16 gram azobis isobutyronitrile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is then allowed to evaporate and the polymer is dried under vacuum at room temperature. In a three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 0.93 gram dicyclohexyl carbodiimide, 25 milligram dimethyl aminopyridine are then added followed by 0.8 gram trimethylol propane. The reaction is continued for 3 to 6 hours. Urea formed during the reaction is removed and the product is obtained by evaporating the filtrate.

EXAMPLE 5

In a three neck 100 mL round bottom flask fitted with a thermowell, condenser, a magnetic needle and a glass tube for nitrogen purging, charged 25 gram methyl methacrylate, 1.8 gram mercapto acetic acid, 0.16 gram azobis isobutyronitnile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is then allowed to evaporate and the polymer is dried under vacuum at room temperature. In a three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 0.5 gram dicyclohexyl carbodiimide, 25 milligram dimethyl aminopyridine are then added followed by 0.43 gram trimethylol propane. The reaction is continued for 3 to 6 hours. Urea formed during the reaction is removed and the product is obtained by evaporating the filtrate.

EXAMPLE 6

In a three neck 100 mL round bottom flask fitted with a thermowell, condenser, a magnetic needle and a glass tube for nitrogen purging, charged 25 gram methyl methacrylate, 0.72 gram mercapto acetic acid, 0.16 gram azobis isobutyronitrile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is then allowed to evaporate and the polymer is dried under vacuum at room temperature. In a three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 0.2 gram dicyclohexyl carbodiimide, 25 milligram dimethyl aminopyridine are then added followed by 0.16 gram trimethylol propane. The reaction is continued for 3 to 6 hours. Urea formed during the reaction is removed and the product is obtained by evaporating the filtrate.

EXAMPLE 7

This examples illustrate the preparation of polycondensable macromonomer from a hydroxyl group containing prepolymer, an organic multifunctional group and a dehydrating agent. In a three neck 100 ml round bottom flask fitted with a thermowell, condenser, a magnetic needle and a glass tube for nitrogen purging, charged 25 gram laurylmethacrylate, 3.0 gram mercapto ethanol, 0.16 gram azobis isobutyronitrile and 29 mL toluene. The reaction mixture is stirred by means of a magnetic stirrer and nitrogen gas is purged continuously. The flask is then heated up to 80° C. The reaction is continued till the disappearance of olifinic signals in $^1$H NMR spectrum. The polymer obtained is precipitated in methanol, washed thoroughly with methanol. The solvent is allowed to evaporate and the polymer is dried under vacuum at room temperature. In a separate three neck 100 mL round bottom flask fitted with a condenser, a magnetic needle and a glass tube for nitrogen purging, 3 gram of the above prepolymer is taken and added 50 mL dry dichloromethane. The temperature of the flask is maintained between 0° C. and 5° C. 1.2 gram dicyclohexyl carbodiimide, 25 milligram dimethyl aminopyridine are then added followed by 0.8 gram dimethylol propionic acid. The reaction is continued for 3 to 6 hours. Urea formed during the reaction is removed and the product is obtained by evaporating the filtrate.

We claim:

1. A process for producing polycondensable macromonomers having formula (I)

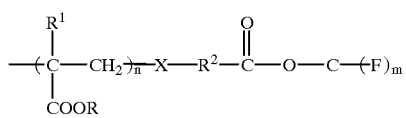
FORMULA I

; wherein
R=an alkyl group with 1–40 carbon atoms;
$R^1$=hydrogen or methyl;
$R^2$=alkylene units;
X=bifunctional moiety;
F=functional group;
n=3–45; and
m=$\geq$2 which comprises reacting a carboxyl or hydroxyl terminated prepolymer, of formula (II)

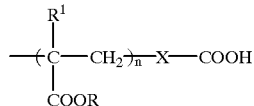
FORMULA II with an organic compound containing two or more isocyanate reactive functional groups, in the presence of a dehydrating agent and a non-reactive solvent at ambient temperature for a period ranging between 3 and 12 hours and separating the product from the reaction mixture.

2. The process as claimed in claim 1 wherein the carboxyl or hydroxyl terminated prepolymer of formula II is prepared by polymerizing a monomer of the formula III,

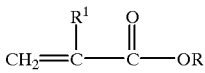
FORMULA III said monomer is selected from the group consisting of methyl methacrylate, butyl methacrylate, lauryl methacrylate, ethyl acrylate, butyl acrylate, hexyl acrylate, n-octyl acrylate, 2-ethylhexyl acrylate, nonyl acrylate, lauryl acrylate and styryl acrylate in the presence of a bifunctional agent of the formula (IV),

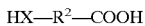   FORMULA IV selected from the group consisting of mercaptoacetic acid, 3-mercaptopropionic acid and mercaptosuccinic acid.

3. The process as claimed in claim 1 wherein prepolymer is esterified with a multifunctional organic compound selected from the group consisting of trimethylol propane, ditrimethylol propane, 1,2,6-hexane triol, pentaerythrytol, di and tripentaerythrytol, sorbitol and glycerine.

4. The process as claimed in claim 1 wherein the dehydrating agent is selected from the group consisting of dicyclohexylcarbodiimide, N,N' carbonyldiimidazole, 4-aminopyridine, phenyl dichlorophosphate, chlorosulfonyl isocyanate, chlorosilanes, alkyl chloroformate-triethyl amine, a mixture of pyrimidine hydrochloride and tributylamine; and a mixture of 2-chloro-1,3,5-trinitrobenzene, pyrimidine and phosphate ester.

5. The process as claimed in claim 1 wherein the solvents used are non reactive towards the prepolymer, multifunctional organic compound and the dehydrating agent and are selected from the group consisting of chlorinated hydrocarbons, esters, ethers, ketoesters, aliphatic, aromatic and alicyclic hydrocarbons, hydrogenated furans and the mixtures thereof.

6. The process as claimed in claim 1 wherein the carboxyl or hydroxyl terminated prepolymer of formula II is prepared by polymerizing a monomer of the formula III,

FORMULA III said monomer is selected from the group consisting of methyl methacrylate, butyl methacrylate, lauryl methacrylate, ethyl acrylate, butyl acrylate, hexyl acrylate, n-octyl acrylate, 2-ethylhexyl acrylate, nonyl acrylate, lauryl acrylate and styryl acrylate in the presence of a bifunctional agent of the formula (V),

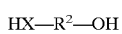   FORMULA V selected from the group consisting of 2-mercapto ethanol, 1-mercapto-2-propanol and 3-mercapto-1-propanol.

7. The process as claimed in claim 1 wherein, prepolymer is esterified with a multifunctional organic compound which is 1,2,6-hexane triol or its isomers.

* * * * *